US011091152B2

(12) United States Patent
Tsuchiya et al.

(10) Patent No.: US 11,091,152 B2
(45) Date of Patent: Aug. 17, 2021

(54) VEHICLE CONTROL DEVICE, VEHICLE CONTROL METHOD, AND STORAGE MEDIUM

(71) Applicant: HONDA MOTOR CO., LTD., Tokyo (JP)

(72) Inventors: Masamitsu Tsuchiya, Wako (JP); Yasuharu Hashimoto, Wako (JP); Etsuo Watanabe, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 101 days.

(21) Appl. No.: 16/286,639

(22) Filed: Feb. 27, 2019

(65) Prior Publication Data

US 2019/0270447 A1   Sep. 5, 2019

(30) Foreign Application Priority Data

Mar. 2, 2018   (JP) .............................. JP2018-037553

(51) Int. Cl.
*B60W 30/09* (2012.01)
*G08G 1/16* (2006.01)

(52) U.S. Cl.
CPC ............. *B60W 30/09* (2013.01); *G08G 1/165* (2013.01); *G08G 1/166* (2013.01);
(Continued)

(58) Field of Classification Search
CPC ......... G06T 7/254; G06T 7/60; G06T 7/0044; G06T 7/0085; G06T 7/40; G06T 2210/00; G06T 2210/21; G06T 5/006; G06T 2207/30252; G08B 13/187; G01C 21/00; G01C 21/12; G01C 21/30; G01C 21/34; G01C 21/3407; B60W 2550/00; B60W 2550/10; B60W 2550/14; B60W 2550/141; B60W 2550/143; B60W 2550/147; B60W 2520/00; B60W 2520/06; B60W 2552/00; B60W 2554/00; B60W 2555/60; B60W 2720/10; B60W 40/00; B60W 40/06;
(Continued)

(56) References Cited

U.S. PATENT DOCUMENTS 8,050,863 B2 * 11/2011 Trepagnier ............ G01S 17/931
701/514
2014/0142837 A1 * 5/2014 Takaki ................... G08G 1/166
701/301
(Continued)

FOREIGN PATENT DOCUMENTS

JP        2004-245610        9/2004

*Primary Examiner* — Anthony R Jimenez
(74) *Attorney, Agent, or Firm* — Amin, Turocy & Watson, LLP

(57) ABSTRACT

Provided is a vehicle control device including: a recognition unit that recognizes a nearby situation of a vehicle; and a driving control unit that automatically controls at least steering of the vehicle on the basis of the nearby situation that is recognized by the recognition unit. In a case where an obstacle that exists in an advancing direction of the vehicle and a road-side structure that is provided in a road edge are recognized by the recognition unit, the driving control unit generates a target trajectory of the vehicle in a state in which a trajectory along which a wheel of the vehicle passes over the road-side structure is included as a candidate.

8 Claims, 11 Drawing Sheets

(52) U.S. Cl.
CPC ..... *B60W 2552/00* (2020.02); *B60W 2554/00* (2020.02); *B60W 2555/60* (2020.02); *B60W 2720/10* (2013.01)

(58) Field of Classification Search
CPC ...... B60W 30/00; B60W 30/08; B60W 30/09; B60W 30/095; B60W 30/0956; B60W 30/10; B60W 30/12; G08G 1/165; G08G 1/166; H04N 7/18; G06K 9/00791; G06K 9/52; G06K 9/4604
USPC .......................................................... 701/41
See application file for complete search history.

(56) References Cited

U.S. PATENT DOCUMENTS

2016/0358477 A1* 12/2016 Ansari ............... G06Q 30/0251
2017/0057497 A1* 3/2017 Laur .................. G06K 9/00805

* cited by examiner

VEHICLE CONTROL DEVICE, VEHICLE CONTROL METHOD, AND STORAGE MEDIUM

CROSS-REFERENCE TO RELATED APPLICATION

Priority is claimed on Japanese Patent Application No. 2018-037553, filed Mar. 2, 2018, the content of which is incorporated herein by reference.

BACKGROUND OF THE INVENTION

Field of the Invention

The present invention relates to a vehicle control device, a vehicle control method, and a storage medium.

Description of Related Art

In the related art, a technology of assisting a driver by detecting a road section in which passing of an oncoming vehicle is difficult on the basis of a road width data stored in map data, and vehicle width data of various vehicles, and notifying a user of the detected road section is known (for example, Japanese Unexamined Patent Application, First Publication No. 2004-245610).

SUMMARY OF THE INVENTION

However, in the technology of the related art, notification is only made to an occupant before reaching the road section in which passing is difficult, and it is necessary for the occupant to perform a driving operation to actually pass through the section. In a case where a vehicle is an automated driving vehicle, in the road section in which passing is difficult, avoidance driving control of avoiding contact with an oncoming vehicle is executed. However, in the avoidance driving control, control of avoiding an obstacle in a range not departing from a road is performed to prevent a situation in which a wheel runs off due to a side groove of a road and the like (that is, a situation in which travelling is difficult due to insertion of the wheel into the side groove, and the like), and thus it is difficult to realize smooth passing driving in some cases.

An aspect of the invention has been made in consideration of such circumstances, and an object of the invention is to provide a vehicle control device capable of realizing smoother passing driving, a vehicle control method, and a storage medium.

The vehicle control device, the vehicle control method, and the storage medium according to the invention employ the following configurations.

(1) According to an aspect of the invention, there is provided a vehicle control device including: a recognition unit that recognizes a nearby situation of a vehicle; and a driving control unit that automatically controls at least steering of the vehicle on the basis of the nearby situation that is recognized by the recognition unit. In a case where an obstacle that exists in an advancing direction of the vehicle and a road-side structure that is provided in a road edge are recognized by the recognition unit, the driving control unit generates a target trajectory of the vehicle in a state in which a trajectory along which a wheel of the vehicle passes over the road-side structure is included as a candidate.

(2) The vehicle control device according to the aspect (1) may further include a passing determination unit that determines whether or not the vehicle is capable of passing the obstacle in a state in which the wheel does not deviate from a road on the basis of a recognition result of the recognition unit. In a case where the passing determination unit determines that the vehicle is not capable of passing the obstacle in a state in which the wheel does not deviate from the road, the driving control unit generates the target trajectory of the vehicle in a state in which the trajectory that passes over the road-side structure is included as a candidate.

(3) In the vehicle control device according to the aspect (1), in a case where the obstacle is not recognized in the advancing direction of the vehicle by the recognition unit, the driving control unit may generate the target trajectory of the vehicle in a state in which the trajectory that passes over the road-side structure is not included as a candidate.

(4) In the vehicle control device according to the aspect (1), in a case where a road partition line that partitions a travel lane of the vehicle and an opposite lane is recognized by the recognition unit, and in a case where the vehicle is allowed to avoid an obstacle, the driving control unit may generate the target trajectory of the vehicle by setting a priority of the trajectory along which the wheel passes over the road-side structure to be higher than a priority of a trajectory along which the vehicle passes across the road partition line.

(5) In the vehicle control device according to the aspect (1), in a case where the vehicle is allowed to avoid the obstacle, the driving control unit may determine whether or not to generate the target trajectory along which the wheel passes over the road-side structure on the basis of a material of the road-side structure which is recognized by the recognition unit.

(6) In the vehicle control device according to the aspect (1), the driving control unit may set a speed of the vehicle in a case where the wheel passes over the road-side structure to be slower than a speed in a case where the vehicle is allowed to travel on the road.

(7) In the vehicle control device according to the aspect (1), in a case where the wheel rides on the road-side structure, the driving control unit may control steering of the vehicle so that an angle of the wheel with respect to an extension direction of a side edge portion of the road-side structure becomes a predetermined angle or greater.

(8) In the vehicle control device according to the aspect (1), in a case where the obstacle is a pedestrian, the driving control unit may generate the target trajectory of the vehicle in a state in which the trajectory along which the wheel passes over the road-side structure is not included as a candidate.

(9) According to another aspect of the invention, there is provided a vehicle control method including: recognizing a nearby situation of a vehicle by a vehicle control device; automatically controlling at least steering of the vehicle by the vehicle control device on the basis of the nearby situation that is recognized; and generating a target trajectory of the vehicle by the vehicle control device in a state in which a trajectory along which wheel of the vehicle passes over a road-side structure is included as a candidate in a case where an obstacle that exists in an advancing direction of the vehicle and the road-side structure that is provided in a road edge are recognized.

(10) According to still another aspect of the invention, there is provided a non-transitory computer-readable storage medium storing a program that allows a vehicle control device to: recognize a nearby situation of a vehicle; automatically control at least steering of the vehicle on the basis of the nearby situation that is recognized; and generate a target trajectory of the vehicle in a state in which a trajectory along which a wheel of the vehicle passes over a road-side structure is included as a candidate in a case where an obstacle that exists in an advancing direction of the vehicle and the road-side structure that is provided in a road edge are recognized.

According to the aspects (1) to (10), it is possible to realize smoother passing driving.

DETAILED DESCRIPTION OF THE INVENTION

Hereinafter, embodiments of a vehicle control device, a vehicle control method, and a storage medium of the invention will be described with reference to the accompanying drawings. In the following description, description will be given of a case where a left-hand driving raw is applied, but in a case where a right-hand driving raw is applied, the right and the left may be switched.

Overall Configuration

Figure 1:
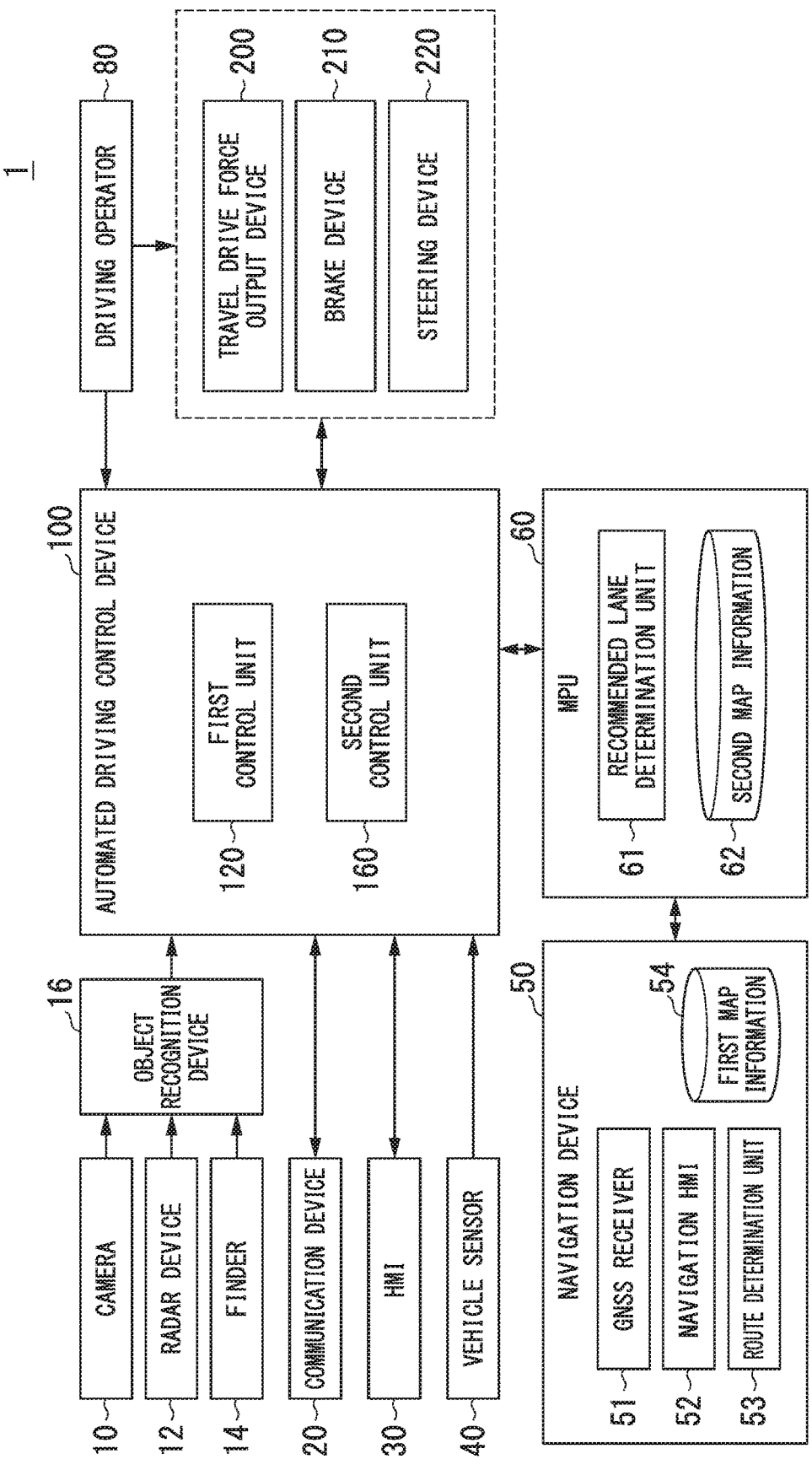
FIG. 1 is a configuration view showing a vehicle system using a vehicle control device according to an embodiment.

FIG. 1 is a configuration view showing a vehicle system 1 that uses a vehicle control device according to an embodiment. Examples of a vehicle on which the vehicle system 1 is mounted include a two-wheel vehicle, a three-wheel vehicle, a four-wheel vehicle, and the like, and examples of a drive source thereof include an internal combustion engine such as a diesel engine and a gasoline engine, an electric motor, and a combination thereof. The electric motor operates by using electric power generated by a generator connected to the internal combustion engine, or discharged electric power of a secondary battery or a fuel cell.

For example, the vehicle system 1 includes a camera 10, a radar device 12, a finder 14, an object recognition device 16, a communication device 20, a human machine interface (HMI) 30, a vehicle sensor 40, a navigation device 50, a map positioning unit (MPU) 60, a driving operator 80, an automated driving control device 100, a travel drive force output device 200, a brake device 210, and a steering device 220. The devices or instruments are connected to each other by a multiplex communication line such as a controller area network (CAN), a serial communication line, a wireless communication line, and the like. The configuration illustrated in FIG. 1 is illustrative only, and parts of the configuration may be omitted, or another configuration may be added. The automated driving control device 100 is an example of a "vehicle control device".

For example, the camera 10 is a digital still camera using a solid-state imaging element such as a charge coupled device (CCD) and a complementary metal oxide semiconductor (CMOS). The camera 10 is attached to an arbitrary site of a vehicle on which the vehicle system 1 is mounted (hereinafter, referred to as a host vehicle M). In a case of capturing an image on a front side, the camera 10 is attached to an upper portion of a front windshield, a rear surface of a rear view mirror, and the like. For example, the camera 10 periodically and repetitively captures images of the surroundings of the host vehicle M. The camera 10 may be a stereo camera.

The radar device 12 emits radio waves such as a millimeter wave to the periphery of the host vehicle M and detects radio waves (reflected waves) reflected from the object to detect at least a position of the object (a distance and an azimuth). The radar device 12 is attached at an arbitrary site of the host vehicle M. The radar device 12 may detect the position and a speed of the object by a frequency modulated continuous wave (FM-CW) method.

The finder 14 is a light detection and ranging (LIDAR). The finder 14 irradiates the periphery of the host vehicle M with light and measures scattered light. The finder 14 detects a distance to a target on the basis of time from light emission to light reception. For example, irradiation light is pulse-shaped laser light. The finder 14 is attached to an arbitrary site of the host vehicle M.

The object recognition device 16 performs sensor fusion processing with respect to a detection result by some or all of the camera 10, the radar device 12, and the finder 14 to recognize a position, a kind, a speed, and the like of the object. The object recognition device 16 outputs a recognition result to the automated driving control device 100. The object recognition device 16 may output a detection result of the camera 10, the radar device 12, and the finder 14 to the automated driving control device 100 as is. The object recognition device 16 may be omitted from the vehicle system 1.

For example, the communication device 20 performs communication with other vehicles near the host vehicle M by using a cellular network, a Wi-Fi network, Bluetooth (registered trademark), dedicated short range communication (DSRC), and the like, or performs communication with various server devices through a wireless base station.

The HMI 30 presents various pieces of information to an occupant of the host vehicle M, and receives an input operation by the occupant. The HMI 30 includes various display devices, a speaker, a buzzer, a touch panel, a switch, a key, and the like.

The vehicle sensor 40 includes a vehicle speed sensor that detects a speed of the host vehicle M, an acceleration sensor that detects acceleration, a yaw rate sensor that detects an angular speed around a vertical axis, and an azimuth sensor that detects a direction of the host vehicle M.

For example, the navigation device 50 includes a global navigation satellite system (GNSS) receiver 51, a navigation HMI 52, and a route determination unit 53. The navigation device 50 retains first map information 54 in a storage device such as a hard disk drive (HDD) and a flash memory. The GNSS receiver 51 specifies a position of the host vehicle M on the basis of a signal that is received from a GNSS satellite. The position of the host vehicle M may be specified or supplemented by an inertial navigation system (INS) using an output of the vehicle sensor 40. The navigation HMI 52 includes a display device, a speaker, a touch panel, a key, and the like. A part or the entirety of the navigation HMI 52 may be common to a part or the entirety of the above-described HMI 30. For example, the route determination unit 53 determines a route (hereinafter, referred to as on-map route) to a destination that is input (or an arbitrary position that is input) by an occupant from the position of the host vehicle M which is specified by the GNSS receiver 51 by using the navigation HMI 52 with reference to the first map information 54. For example, the first map information 54 is information in which a road shape is expressed by a link that represents a road and a node that is connected to the link. The first map information 54 may include a curvature of a road, point of interest (POI) information, and the like. The on-map route is output to the MPU 60. The navigation device 50 may performs route guidance by using the navigation HMI 52 on the basis of the on-map route. For example, the navigation device 50 may be realized by a function of a terminal device such as a smart phone and a tablet terminal which are carried by an occupant. The navigation device 50 may transmit a current position and a destination to a navigation server through the communication device 20, and may acquire the same route as the on-map route from the navigation server.

For example, the MPU 60 includes a recommended lane determination unit 61, and retains second map information 62 in a storage device such as an HDD and a flash memory. The recommended lane determination unit 61 divides the on-map route that is provided from the navigation device 50 into a plurality of blocks (for example, for every 100 [m] in a vehicle advancing direction), and determines a recommended lane for every block with reference to the second map information 62. The recommended lane determination unit 61 determines which lane from the left the vehicle will travel in. In a case where a branch site exists in the on-map route, the recommended lane determination unit 61 determines a recommended lane in order for the host vehicle M to travel along a reasonable route to proceed to a branch destination.

The second map information 62 is map information with higher accuracy in comparison to the first map information 54. For example, the second map information 62 includes lane center information, lane boundary information, and the like. The second map information 62 may include road information, traffic restriction information, address information (addresses, postal codes), facility information, telephone information, and the like. The second map information 62 may be updated at any time through communication between the communication device 20 and other devices.

For example, the driving operator 80 includes an accelerator pedal, a brake pedal, a shift lever, a steering wheel, a heteromorphic steering, a joy stick, and other operators. A sensor that detects an operation amount or presence and absence of an operation is attached to the driving operator 80, and a detection result thereof is output to the automated driving control device 100, or a part or the entirety of the travel drive force output device 200, the brake device 210, and the steering device 220.

For example, the automated driving control device 100 includes a first control unit 120 and a second control unit 160. Each of the first control unit 120 and the second control unit 160 is realized, for example, when a hardware processor such as a central processing unit (CPU) executes a program (software). A part or the entirety of the configurations may be realized by hardware (circuit unit; including circuitry) such as a large scale integration (LSI), an application specific integrated circuit (ASIC), a field-programmable gate array (FPGA), and a graphics processing unit (GPU), or may be realized by cooperation of software and hardware. The program may be stored in a storage device such as the HDD and the flash memory of the automated driving control device 100 in advance, or may be stored in a detachable storage medium such as a DVD and a CD-ROM and may be installed in the HDD or the flash memory of the automated driving control device 100 when the storage medium is mounted in a drive device. A combination of an action plan generation unit 140 and the second control unit 160 is an example of "driving control unit". The driving control unit automatically controls at least steering in a speed or steering of the host vehicle M on the basis of a nearby situation that is recognized by a recognition unit 130.

Figure 2:
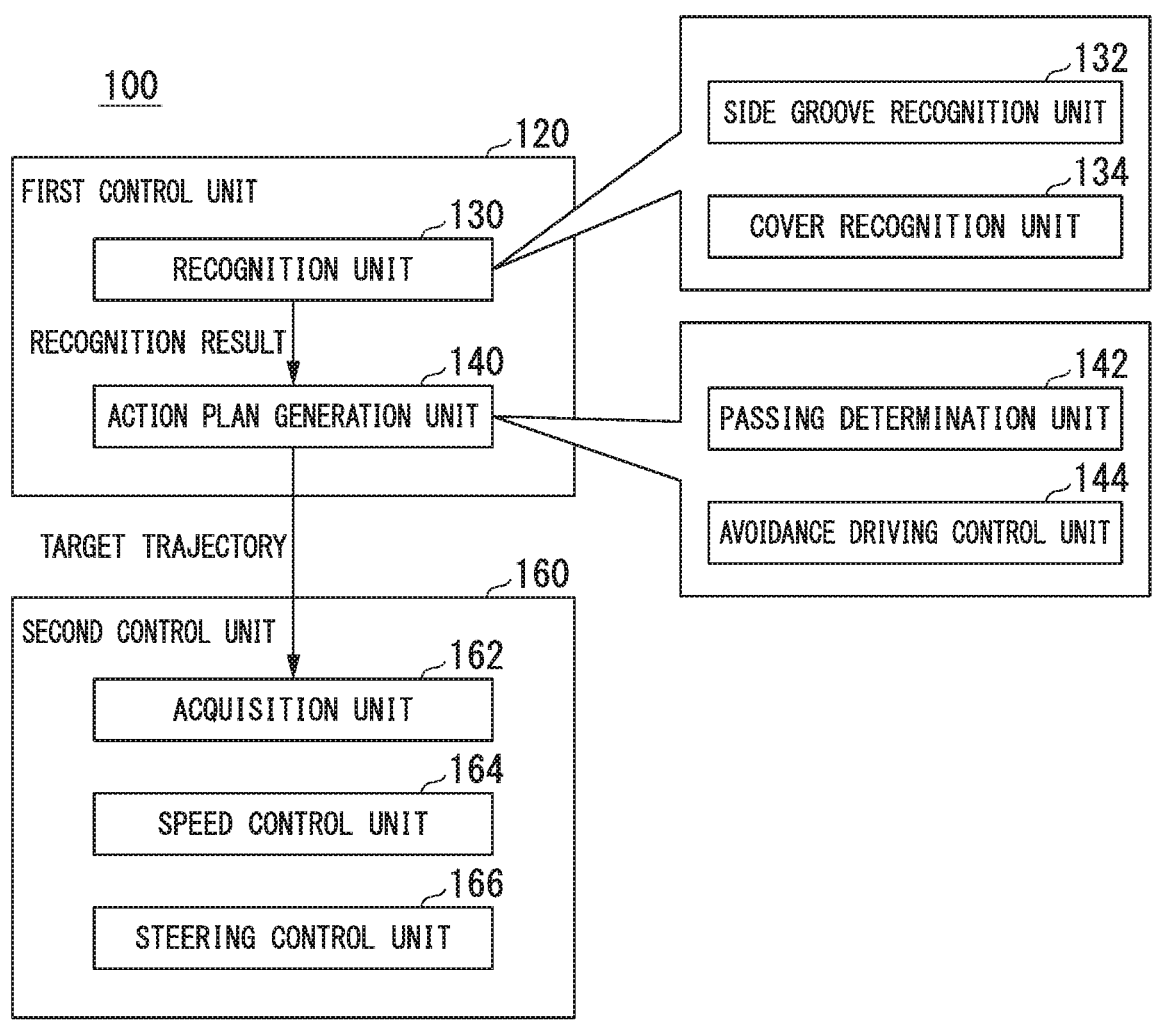
FIG. 2 is a functional configuration view showing a first control unit and a second control unit.

FIG. 2 is a functional configuration view of the first control unit 120 and the second control unit 160. For example, the first control unit 120 includes the recognition unit 130 and the action plan generation unit 140. For example, the first control unit 120 realizes a function by artificial intelligence (AI) and a function by a model that is given in advance in parallel to each other. For example, an "intersection recognition" function may be realized by executing recognition of an intersection through deep learning and recognition based on conditions (including a pattern-matching possible signal, a road sign, and the like) which are given in advance in parallel and by conducting scoring with respect to both the recognitions for comprehensive evaluation. According to this, reliability of automated driving is secured.

The recognition unit 130 recognizes a position, and a state such as a speed and acceleration of a nearby object of the host vehicle M on the basis of information that is input from the camera 10, the radar device 12, and the finder 14 through the object recognition device 16. Examples of the object include a pedestrian, a bicycle, a moving body such as another vehicle, an obstacle such as a construction site. For example, the position of the object is recognized as a position on absolute coordinates in which a representative point of the host vehicle M (the center of gravidity, the center of a driving shaft, and the like) is set as the origin, and is used in control. The position of the object may be shown as a representative point such as the center of gravity and a corner of the object, or may be shown as an expressed region. In a case where the object is the other vehicle, "state" of the object may include acceleration or a jerk of the object, or "action state" (for example, a state in which a lane is changing, or whether or not to intend lane changing). In a case where the object is the pedestrian or the bicycle, "state" of the object may include a direction in which the object moves, or "action state" (for example, a state in which the object is crossing a road, or whether or not the object intends to cross the road).

For example, the recognition unit 130 recognizes a lane (travel lane) in which the host vehicle M is travelling. For example, the recognition unit 130 recognizes the travel lane through pattern comparison between a pattern (for example, an arrangement of a solid line and a broken line) of a road partition line obtained from the second map information 62, and a pattern of a nearby road partition line of the host vehicle M which is recognized from an image captured by the camera 10. The recognition unit 130 may recognize the travel lane by recognizing a running road boundary (road boundary) including the road partition line, a side road, a curbstone, a median strip, a guard rail, and the like without limitation to the road partition line. In the recognition, the position of the host vehicle M which is acquired form the navigation device 50, or a processing result by the INS may be added. The recognition unit 130 recognizes a width of a road on which the host vehicle M travels. In this case, the recognition unit 130 may recognizes the road width from an image that is captured by the camera 10, or may recognize the road width from the road partition line that is obtained from the second map information 62. The recognition unit 130 may recognize a width (for example, a vehicle width of the other vehicle), a height, a shape, and the like of the obstacle on the basis of the image that is captured by the camera 10. The recognition unit 130 recognizes a temporary stop line, a red sign, a tollgate, and other road events. The recognition unit 130 recognizes a road-side structure of a travel lane. The road-side structure is a structure on which travel is possible depending on a situation although a vehicle does not travel thereon at ordinary times, and examples thereof include a side groove that is for drainage and the like, a cover that is placed on the side groove, a side walk that has a step difference with the travel lane, and the like. The road-side structure may be continuously provided along the road side, or may be provided at a part of the road side. In the following description, it is assumed that the cover that is placed on the side groove is used as an example of the road-side structure.

The recognition unit 130 recognizes a position or a posture of the host vehicle M with respect to the travel lane when recognizing the travel lane. For example, the recognition unit 130 may recognize a deviation of the host vehicle M from the center of a lane which is a representative point, and an angle of the host vehicle M with respect to a line that straightly connects the center of a lane in an advancing direction of the host vehicle M as a relative position and a posture of the host vehicle M with respect to the travel lane. Alternatively, the recognition unit 130 may recognize a position of a representative point of the host vehicle M with respect to an arbitrary side edge portion (a road partition line or a road boundary) of the travel lane, and the like as the relative position of the host vehicle M with respect to the travel lane. The recognition unit 130 may recognize a structure (for example, an electric pole, a median strip, and the like) on a road on the basis of the first map information 54 or the second map information 62. Functions of a side groove recognition unit 132 and a cover recognition unit 134 of the recognition unit 130 will be described later.

The action plan generation unit 140 generates a target trajectory along which the host vehicle M automatically travels in the future (without depending on an operation by a driver) so that the host vehicle M principally travels a recommended lane determined by the recommended lane determination unit 61 and the host vehicle M can cope with a nearby situation of the host vehicle M. The target trajectory is a target trajectory through which a representative point of the host vehicle M passes. For example, the target trajectory includes a speed element. For example, the target trajectory is expressed by sequentially arranging points (trajectory points) which the host vehicle M will reach. The trajectory points are points which the host vehicle M will reach for every predetermined travel distance (for example, approximately several [m]) in a distance along a road, and a target speed and target acceleration for predetermined sampling time (for example, approximately zero point several [sec]) are additionally generated as a part of the target trajectory. The trajectory points may be positions which the host vehicle M will reach at a sampling time for predetermined sampling time. In this case, information of the target speed or the target acceleration is expressed as an interval of the trajectory points.

The action plan generation unit 140 may set an automated driving event when generating the target trajectory. Examples of the automated driving event include a constant speed travel event, a low-speed following travel event, a lane changing event, a branching event, a merging event, a take-over event, and the like. The action plan generation unit 140 generates a target trajectory corresponding to an activated event. Functions of a passing determination unit 142 and an avoidance driving control unit 144 of the action plan generation unit 140 will be described later.

The second control unit 160 controls the travel drive force output device 200, the brake device 210, and the steering device 220 so that the host vehicle M passes through a target trajectory generated by the action plan generation unit 140 at on a scheduled time.

For example, the second control unit 160 includes an acquisition unit 162, a speed control unit 164, and a steering control unit 166. The acquisition unit 162 acquires information of a target trajectory (trajectory points) generated by the action plan generation unit 140, and stores the information in a memory (not illustrated). The speed control unit 164 controls the travel drive force output device 200 or the brake device 210 on the basis of a speed element associated with the target trajectory that is stored in the memory. The steering control unit 166 controls the steering device 220 in correspondence with a curve state of the target trajectory stored in the memory. Processing of the speed control unit 164 and the steering control unit 166 is realized, for example, by a combination of feed forward control and feedback control. As an example, the steering control unit 166 executes feed forward control in response to a curvature of a road in front of the host vehicle M, and feedback control based on a deviation from the target trajectory in combination with each other.

The travel drive force output device 200 outputs a travel drive force (torque) necessary for vehicle travel to driving wheels. For example, the travel drive force output device 200 includes a combination of an internal combustion engine, an electric motor, and a transmission, and an ECU that controls these components. The ECU controls the components in accordance with information input from the second control unit 160, or information that is input from the driving operator 80.

For example, the brake device 210 includes a brake caliper, a cylinder that transmits a hydraulic pressure to the brake caliper, an electric motor that generates the hydraulic pressure in the cylinder, and a brake ECU. The brake ECU controls the electric motor in accordance with information that is input from the second control unit 160 or the information that is input from the driving operator 80, and allows brake torque in response to a braking operation to be output to respective wheels. The brake device 210 may include a mechanism that transmits a hydraulic pressure generated by an operation of a brake pedal included in the driving operator 80 to the cylinder through a master cylinder as a backup mechanism. The brake device 210 may be an electromagnetic control type hydraulic pressure brake device that controls an actuator in accordance with information input from the second control unit 160 and transmits a hydraulic pressure of the master cylinder to the cylinder without limitation to the above-described configuration.

For example, the steering device 220 includes a steering ECU and an electric motor. For example, the electric motor applies a force to a rack and pinion mechanism to change a direction of front steering wheels. The steering ECU drives the electric motor in accordance with information input from the second control unit 160 or information input from the driving operator 80 to change the direction of the front steering wheels.

Function of Side Groove Recognition Unit

Figure 3:
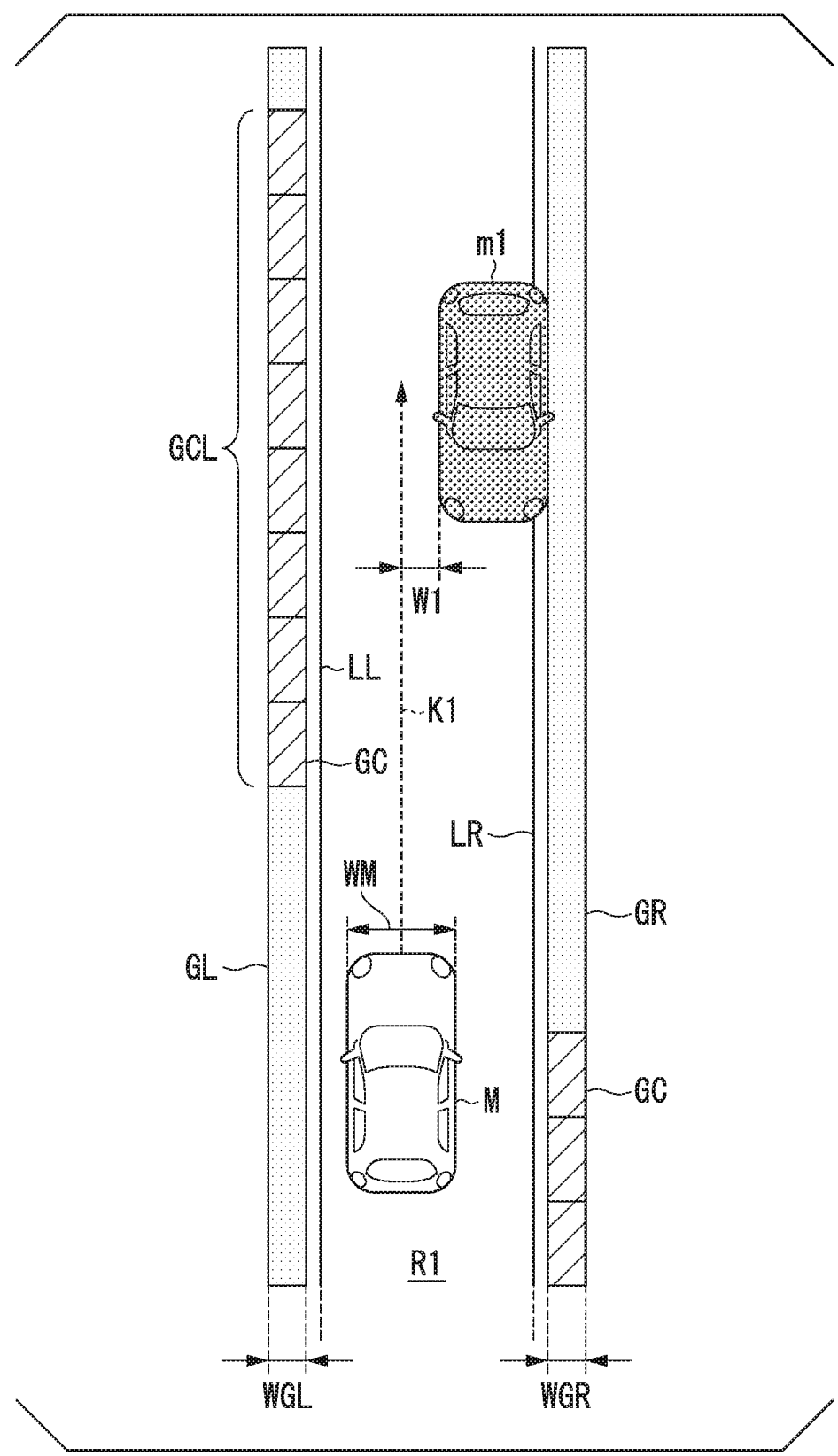
FIG. 3 is a view showing an example of processing of a side groove recognition unit.

The side groove recognition unit 132 recognizes a side groove of a road on which the host vehicle M travels. FIG. 3 is a view showing an example of processing of the side groove recognition unit 132. In the example in FIG. 3, it is assumed that the host vehicle M is travelling on a road R1. For example, the side groove recognition unit 132 analyzes an image captured by the camera 10, and recognizes a side groove GL that is provided in the vicinity of a left road partition line (road edge) LL of the road R1 on the basis of luminance information of that image that is analyzed. The side groove recognition unit 132 may recognize a side groove GR that is provided in the vicinity of a right road partition line LR of the road R1 in addition to or instead of the side groove GL. For example, the vicinity of the road partition line is a region that is included within a predetermined distance from the road partition line. For example, the side grooves GL and the GR are grooves to drain rainwater on a road surface of the road R1, and are concave objects which are embedded in the ground to extend along the road partition line LL or LR.

For example, the side groove recognition unit 132 recognizes a region (space) having a predetermined depth or greater as a groove, and does not recognize a region having a depth less than the predetermined depth as the groove. For example, the predetermined depth is a depth at which a wheel of the host vehicle M is inserted into the side groove, or the wheel falls into the side groove, and thus travel is suppressed. In a case where water is collected in the groove, the side groove recognition unit 132 cannot recognize the depth of the groove. According to this, in a case where a region recognized as a water surface through analysis of an image captured by the camera 10 extends along the road partition line LL or LR, even in a case where the region is not recognized as a region having a predetermined depth or greater, the side groove recognition unit 132 recognizes the region as a groove.

The side groove recognition unit 132 recognizes groove widths WGL and WGR of the grooves GL and GR, and may recognize the groves GL and GR as a groove in a case where the groove widths WGL and WGR are equal to or greater than a wheel width of the host vehicle M, and may not recognize the grooves GL and GR as a groove in a case where the groove widths WGL and WGR are less than the wheel width of the host vehicle M. According to this, the side groove recognition unit 132 can exclude a groove into which the wheel is not inserted.

Function of Cover Recognition Unit

For example, the cover recognition unit 134 analyzes an image that is captured by the camera 10, and recognizes a cover GC that is placed on the side grooves GL and GR which are recognized by the side groove recognition unit 132. For example, the cover recognition unit 134 analyzes an image captured by the camera 10 to acquire luminance, and distinguishes and recognizes the side groove GL and the cover GC on the basis of a difference in the luminance that is acquired. The cover recognition unit 134 may detect a distance up to a target obtained by the finder 14, and may recognize a three-dimensional shape of the side groove GL or the cover GC on the basis of a difference in the distance that is detected to distinguish and recognize the side groove GL and the cover GC.

For example, the cover GC is an object that is assumed to endure a load in a case where the wheel of the host vehicle M passes over the cover GC. For example, passing over the cover GC represents that a wheel of the host vehicle M continuously passes over the cover GC in a predetermined section. In a case where travel in an outer region of the side groove GL when seen from the road R1 is possible, passing over the cover GC may include a situation in which a wheel of the host vehicle M temporarily passes over the cover GC to pass through the outer region or to return from the outer region to the road R1. For example, the cover GC is an object that is formed by a steel plate, a wood plate, concrete and the like, or a grating obtained by combining a steel material in a lattice shape. The grating has a drainage function to the side groove in a state of being placed on the side grooves GL and GR. The cover recognition unit 134 may estimate a material of the cover GC from luminance, a color, a shape, and the like on the basis of an analysis result of an image captured by the camera 10. The cover recognition unit 134 may recognize a distance GCL within which the recognized cover GC is continuous along the road R1. For example, "cover GC is contiguous along the road R1" represents a gap between covers is a narrow gap within a predetermined distance. The cover recognition unit 134 may recognize a height of the cover GC.

Function of Passing Determination Unit

In a case where an obstacle is recognized in an advancing direction of the host vehicle M by the recognition unit 130, the passing determination unit 142 determines whether or not passing through the obstacle is possible in accordance with a target trajectory that is generated by the action plan generation unit 140. In the example in FIG. 3, it is assumed that another vehicle (oncoming vehicle) m1 as an example of the obstacle is parked on the road R1. In a case where the other vehicle m1 is recognized by the recognition unit 130, the passing determination unit 142 determines whether or not it is possible to pass the other vehicle m1 in accordance with a target trajectory K1 that is generated by the action plan generation unit 140. For example, the passing determination unit 142 determines whether or not a distance W1 from a side edge portion of the other vehicle m1, which protrudes toward a road center side from a road edge (road partition line LR) of the other vehicle m1, to the target trajectory K1 is equal to or greater than a total value T1 of a half width WM/2 of a vehicle width WM of the host vehicle M and an inter-vehicle gap (margin width C) in passing. In a case where the distance W1 is equal to or greater than the total value T1, the passing determination unit 142 determines that it is possible to pass the other vehicle m1 in a case of the distance W1 through travel along the target trajectory K1. In this case, the passing determination unit 142 sets the target trajectory K1 as an actually travelling target trajectory. In a case where the distance W1 is less than the total value T1, the passing determination unit 142 determines that it is difficult to pass the other vehicle m1 through travel along the target trajectory K1 within the distance W1.

Function of Avoidance Driving Control Unit

Figure 4:
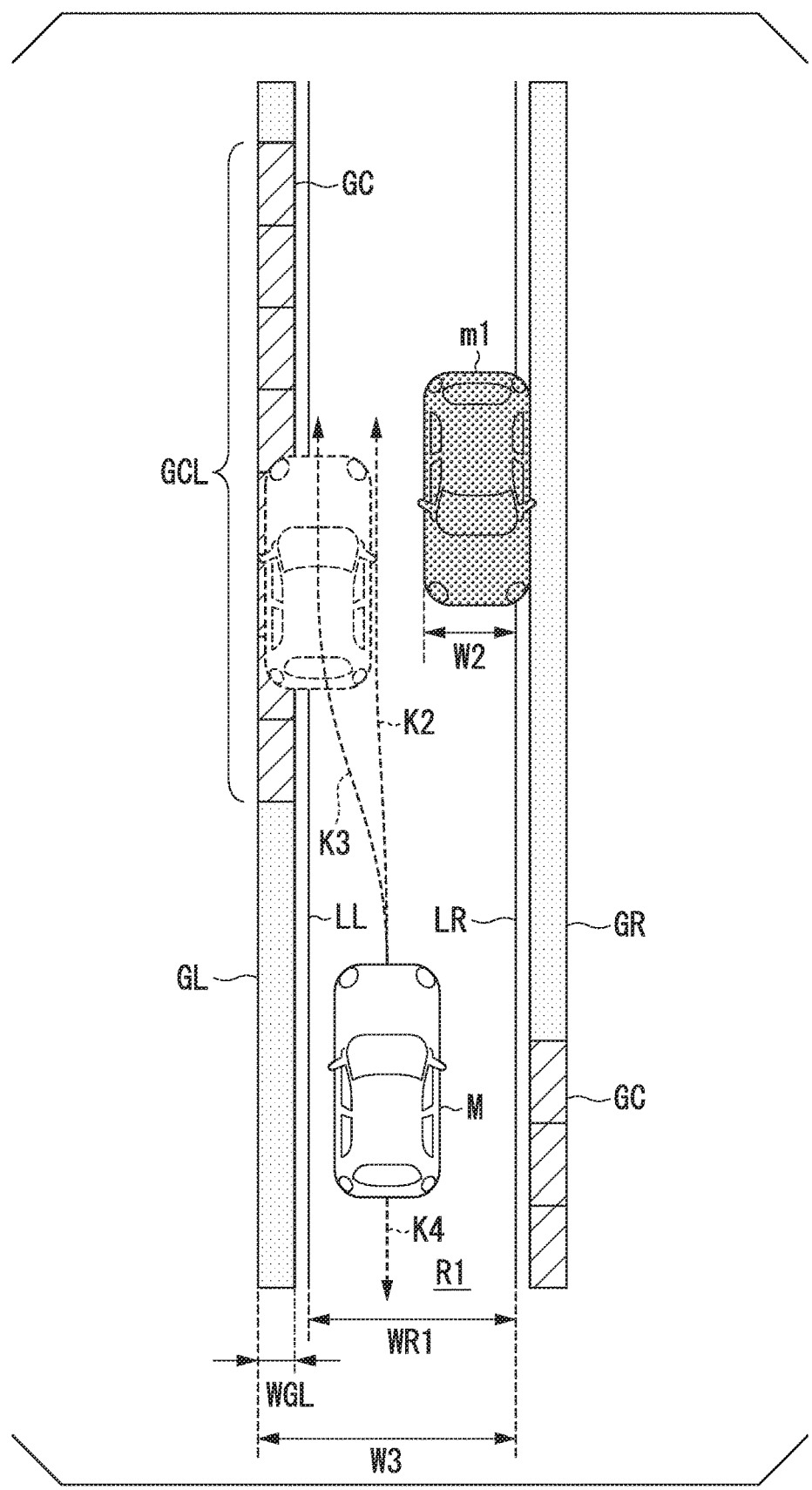
FIG. 4 is a view showing an example of processing of an avoidance driving control unit.

In a case where the passing determination unit 142 determines that it is difficult to pass the other vehicle m1 in the target trajectory K1, the avoidance driving control unit 144 generates a trajectory candidate for travel while avoiding contact with the other vehicle m1. FIG. 4 is a view showing an example of processing of the avoidance driving control unit 144.

For example, the avoidance driving control unit 144 determines whether or not a target trajectory K2 for passing the other vehicle m1 without deviation from the road R1 can be generated. For example, as illustrated in FIG. 3, "deviation from a road" represents that a wheel of the host vehicle M gets out from a region of the road R1 that is partitioned by the road partition lines LL and LR in a case of a road (narrow road) having a narrow road width such as the road R1 on which a road partition line that partitions a travel lane of the host vehicle M and an opposite lane is not present. In this case, even in a case where the host vehicle M travels on a side in which an oncoming vehicle travels, this case is not included in the "deviation from a road". As illustrated in a modification example to be described later, in a case of a road having a wide road width such as a road on which a road partition line (hereinafter, referred to as a central lane CL) that partitions the travel lane and the opposite lane is present, "deviation from a road" may include a situation in which a wheel of the host vehicle M passes through the opposite lane across the central line CL.

The avoidance driving control unit 144 determines whether or not a total value T2 of the vehicle width WM of the host vehicle M, a protruding distance W2 of the other vehicle m1 from the road edge (road partition line LR) toward the road center side, and the margin width C is less than a road width WR1 that is recognized by the recognition unit 130. In a case of calculating the above-described total value T2, a vehicle width of the other vehicle m1 may be used instead of the distance W2.

In a case where the total value T2 is less than the road width WR1, the avoidance driving control unit 144 determines that the host vehicle M can pass the other vehicle m1 without deviation from the road R1. In this case, the avoidance driving control unit 144 determines the target trajectory K2 as an actually travelling target trajectory. In a case where the total value T2 is equal to or greater than the road width WR1, the avoidance driving control unit 144 determines that the host vehicle M cannot pass the other vehicle m1 without deviation from the road R1.

In a case where it is determined that the host vehicle M cannot pass the other vehicle m1 without deviation from the road R1, the avoidance driving control unit 144 determines whether or not a cover GC is recognized by the cover recognition unit 134. In a case where the cover GC is recognized by the cover recognition unit 134, the avoidance driving control unit 144 determines whether or not to generate a target trajectory K3 along which a wheel of the host vehicle M passes over the cover GC as a trajectory candidate. Specifically, the avoidance driving control unit 144 calculates a total value W3 of the road width WR1, and a distance from the road partition line LL to an edge portion of the side groove GL on an outer side of the road R1, and determines whether or not the calculated total value W3 is equal to or greater than the total value T2. In a case where the total value W3 is equal to or greater than the total value T2, the avoidance driving control unit 144 determines that when the host vehicle M deviates from the road R1 and a wheel passes over the cover GC, the host vehicle M can pass the other vehicle m1, and generates a target trajectory K3 in which the wheel of the host vehicle M passes over the cover GC.

For example, in a case where a distance GCL within which the cover GC recognized by the cover recognition unit 134 continues along the road R1 is equal to or longer than a predetermined distance, the avoidance driving control unit 144 may generate the target trajectory K3 of passing over the cover GC. For example, the predetermined distance is a length that is approximately two to three [times] a vehicle length of the host vehicle M. The reason for this is as follows. In a case where the distance GCL is shorter than the predetermined distance, there is a high probability that the cover GC may disappear before a wheel return onto a road.

Figure 5:
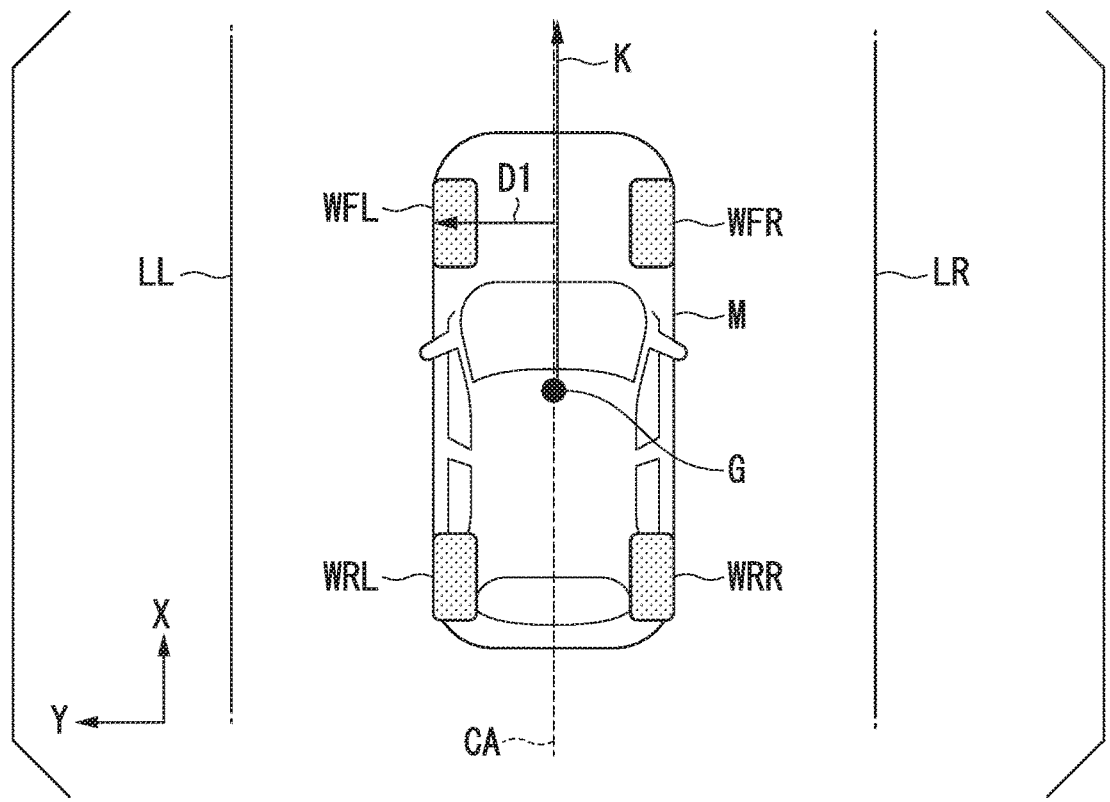
FIG. 5 is a view showing content of processing of generating a target trajectory along which a wheel passes over a cover (first view)

FIG. 5 is a view showing content of processing of generating a target trajectory along which a wheel passes over the cover GC (first view). In FIG. 5, left and right front wheels WFL and WFR, and left and right rear wheels WRL and WRR of the host vehicle M are illustrated. In a case of generating the trajectory along which a wheel passes over the cover GC, first, the avoidance driving control unit 144 temporarily sets a target trajectory K through which a representative point G of the host vehicle M passes, generates an offset trajectory in which the temporarily set target trajectory K is offset in a lateral direction (a road width direction; a Y-direction in the drawing) by a distance D1 up to an outer side of the wheel WFL of the host vehicle M, and generates a target trajectory K3 so that the generated offset trajectory passes over the cover GC. In a case where a posture of the host vehicle M is parallel to the road, the avoidance driving control unit 144 may generate an offset trajectory that is offset by the distance D1 from a central axis CA of the host vehicle M to the left.

Figure 6:
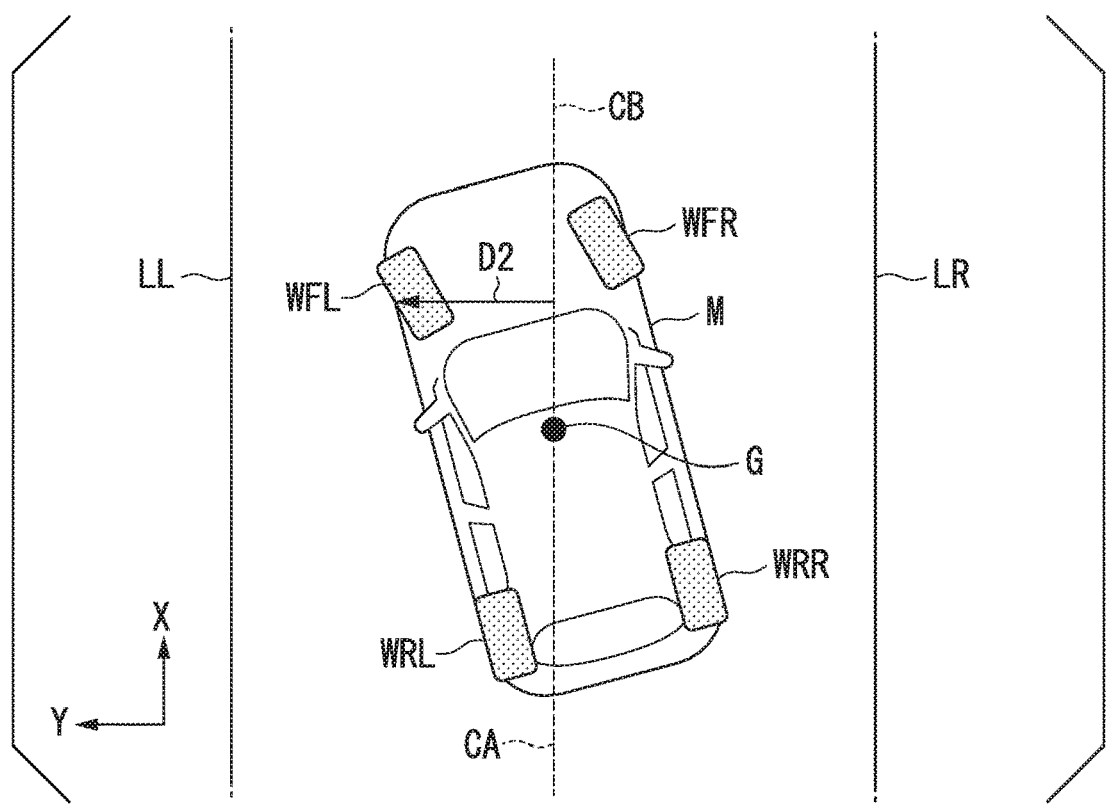
FIG. 6 is a view showing the content of processing of generating the target trajectory along which the wheel passes over the cover (second view).

FIG. 6 is a view showing the content of processing of generating the target trajectory along which the wheel passes over the cover GC (second view). For example, in a case where the posture of the host vehicle M is not parallel with respect to the road and the posture of the host vehicle M is inclined to the left with respect to the road differently from FIG. 5, as illustrated in FIG. 6, the avoidance driving control unit 144 may generate an offset trajectory in which a distance D2 from a straight line CB that passes through the representative point G and is parallel to a road extension direction to the outer side of the wheel WFL is offset.

Figure 7:
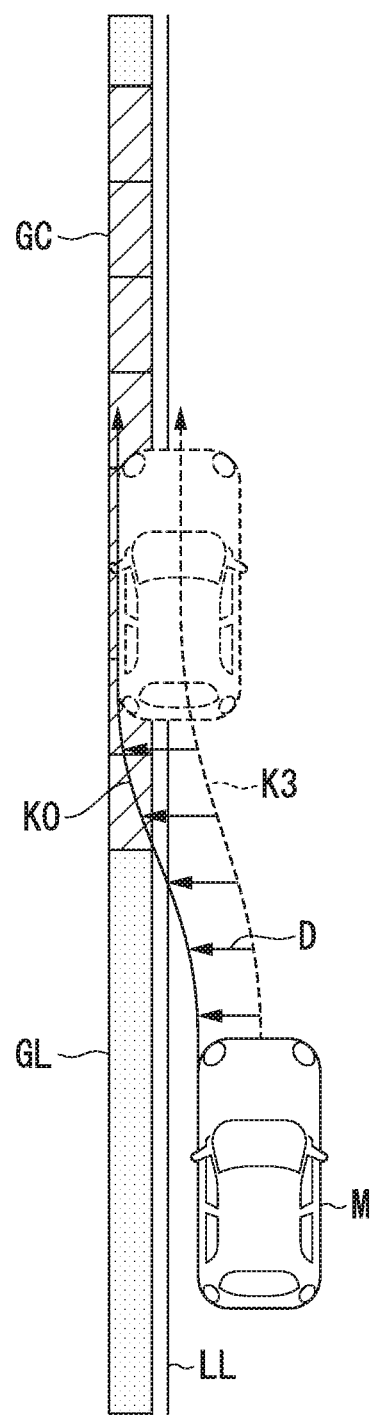
FIG. 7 is a view showing an example of an offset trajectory.

FIG. 7 is a view showing an example of an offset trajectory KO. As illustrated in FIG. 5 and FIG. 6, the avoidance driving control unit 144 generates the offset trajectory KO in which a distance D is adjusted on the basis of the posture of the host vehicle M, and generates a target trajectory K3 so that the wheel WFL passes through the offset trajectory KO that is generated. The avoidance driving control unit 144 may generate an offset trajectory of the wheel WRL that passes over the cover GC in addition to the offset trajectory KO of the wheel WFL, and may generate the target trajectory K3 of traveling on the cover GC at the offset trajectories which are respectively generated.

Figure 8:
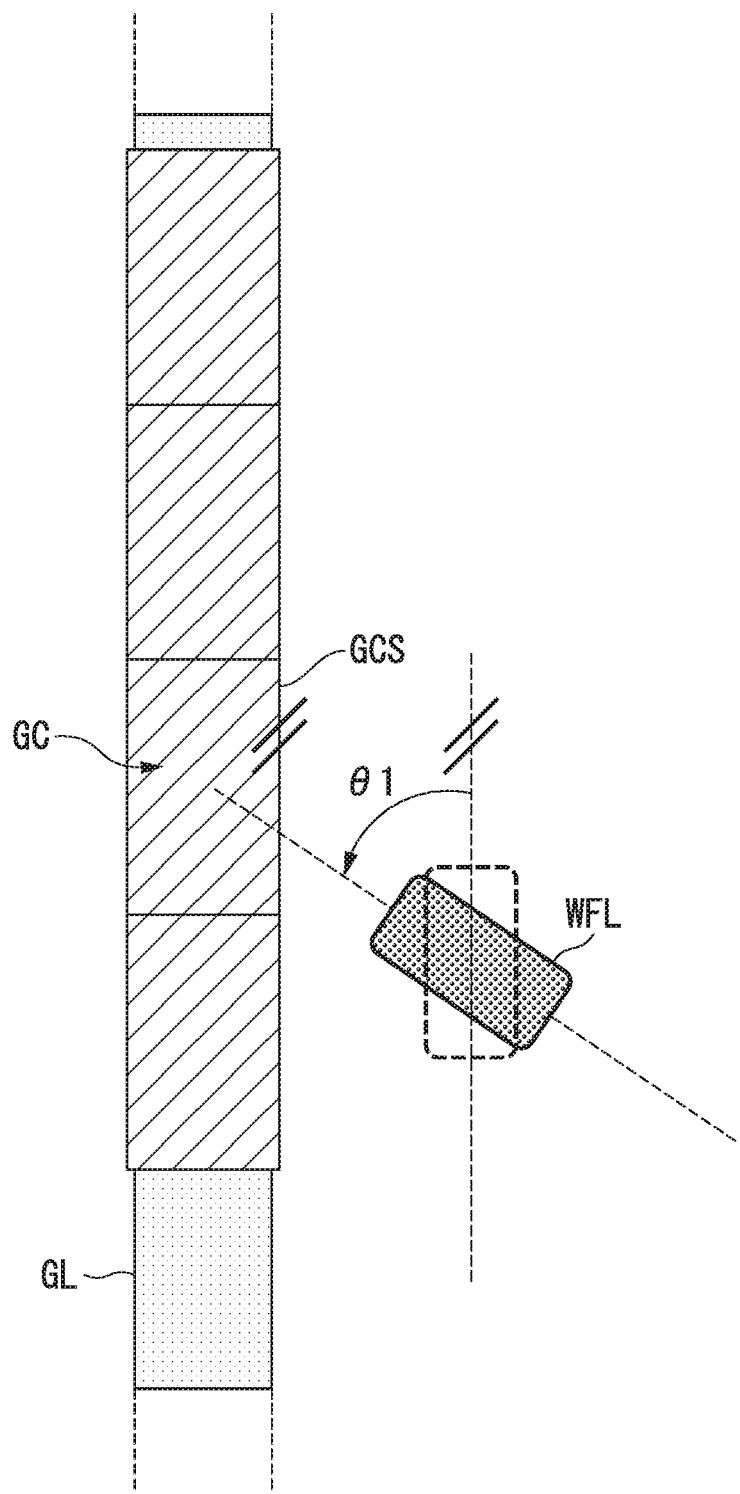
FIG. 8 is a view showing angle of a wheel that rides on the cover.

In a case of generating the target trajectory K3 in which the wheel WFL rides on the cover GC, the avoidance driving control unit 144 may generate the target trajectory K3 in which steering of the host vehicle is controlled so that an angle of the wheel WFL with respect to an extension direction of a side edge portion of the cover GC becomes a predetermined angle or greater. FIG. 8 is a view showing an angle of the wheel WRL that rides on the cover GC. In a case where the wheel WFL of the host vehicle M is allowed to ride on the cover GC, the avoidance driving control unit 144 generates a target trajectory in which a steering angle is increased so that an angle θ1 of the wheel WFL with respect to an extension direction of a side edge portion GCS of the cover GC becomes equal to or greater than a predetermined angle θth. The predetermined angle θth may be a fixed value, or may be changed in accordance with a shape or a material of the cover GC. As described above, when the angle θ1 of the wheel WFL is set to be equal to or greater than the predetermined angle θth, it is possible to improve stability of the host vehicle M when riding on the cover GC.

The avoidance driving control unit 144 may determine whether or not to generate the target trajectory K3 along which the wheel of the host vehicle M passes over the cover GC on the basis of the material of the cover GC which is recognized by the recognition unit 130. For example, in a case where the material of the cover GC is concrete or a grating, even when the wheel of the host vehicle M rides on the cover GC, a possibility of breakage of the cover GC is low, and thus the target trajectory K3 is generated. In a case where the material of the cover GC is a wood plate, and the like, there is a possibility that riding of the host vehicle M is not assumed, and it is assumed that the cover GC may be broken when the wheel of the host vehicle M rides on the cover GC. According to this, in a case where the material of the cover is a predetermined material such as the wood plate, the avoidance driving control unit 144 does not generate the target trajectory K3. According to this, it is possible to allow the host vehicle M to appropriately travel. In a case where the material of the cover GC is an easily slipping material such as an iron plate, the avoidance driving control unit 144 may not allow the target trajectory K3 to be generated. According to this, it is possible to suppress occurrence of slipping of the host vehicle M or a deviation of a travel position thereof, and thus it is possible to perform more suitable driving control.

In a case where a height H1 of the cover GC is recognized by the cover recognition unit 134, the avoidance driving control unit 144 may determine whether or not the recognized height H1 of the cover GC is less than a predetermined height Hth. The predetermined height Hth may be a fixed value, or a value in which a radius of a wheel and the like is set as a reference (for example, the half of the radius of the wheel). In addition, the avoidance driving control unit 144 generates the target trajectory K3 in a case where the recognized height H1 of the cover GC is less than the predetermined height Hth, and does not generate the target trajectory K3 in a case where the height H1 of the cover GC is equal to or greater than the predetermined height Hth.

In a case of allowing the host vehicle M to travel along the target trajectory K3, the avoidance driving control unit 144 sets a travel speed of the host vehicle M to be slower in comparison to a case where the host vehicle M is allowed to travel in a route (for example, the road R1) other than an upper side of the cover GC. According to this, it is possible to suppress a situation in which the cover GC is moved due to strength or a direction of a force that is applied to the cover GC when the wheel of the host vehicle M rides on the cover GC, and the cover GC deviates from the side groove GL.

In a case where the wheel of the host vehicle M passes over the cover GC along the target trajectory K3, the avoidance driving control unit 144 may operate an external notification device such as a hazard lamp. According to this, it is possible to notify the periphery of a situation in which the host vehicle M travels over the cover GC that is more unstable in comparison to the road R1. As described above, in a case where an obstacle exists in front of the host vehicle M, a target trajectory in which an upper side of the cover GC of the side groove GL is set as a travel possible region is generated, and thus it is possible to improve continuity of automated diving on a narrow road as an example.

In a case where the total value W3 is less than the total value T2, the avoidance driving control unit 144 may generate a target trajectory of avoiding contact through stopping or receding of the host vehicle M, and the like as a trajectory candidate. In FIG. 4, a target trajectory K4 of allowing the host vehicle M to recede is generated.

Modification Example

In the above-described embodiment, description has been given of a case where the other vehicle (oncoming vehicle) m1 is parked (stopped). However, in a case where the other vehicle m1 is travelling on an opposite side, the avoidance driving control unit 144 may generate a target trajectory in which the host vehicle M stops in a state in which the wheel is positioned on the cover GC, and after the other vehicle m1 passes through the host vehicle M, the host vehicle M returns to the road R1 and travels thereon.

Figure 9:
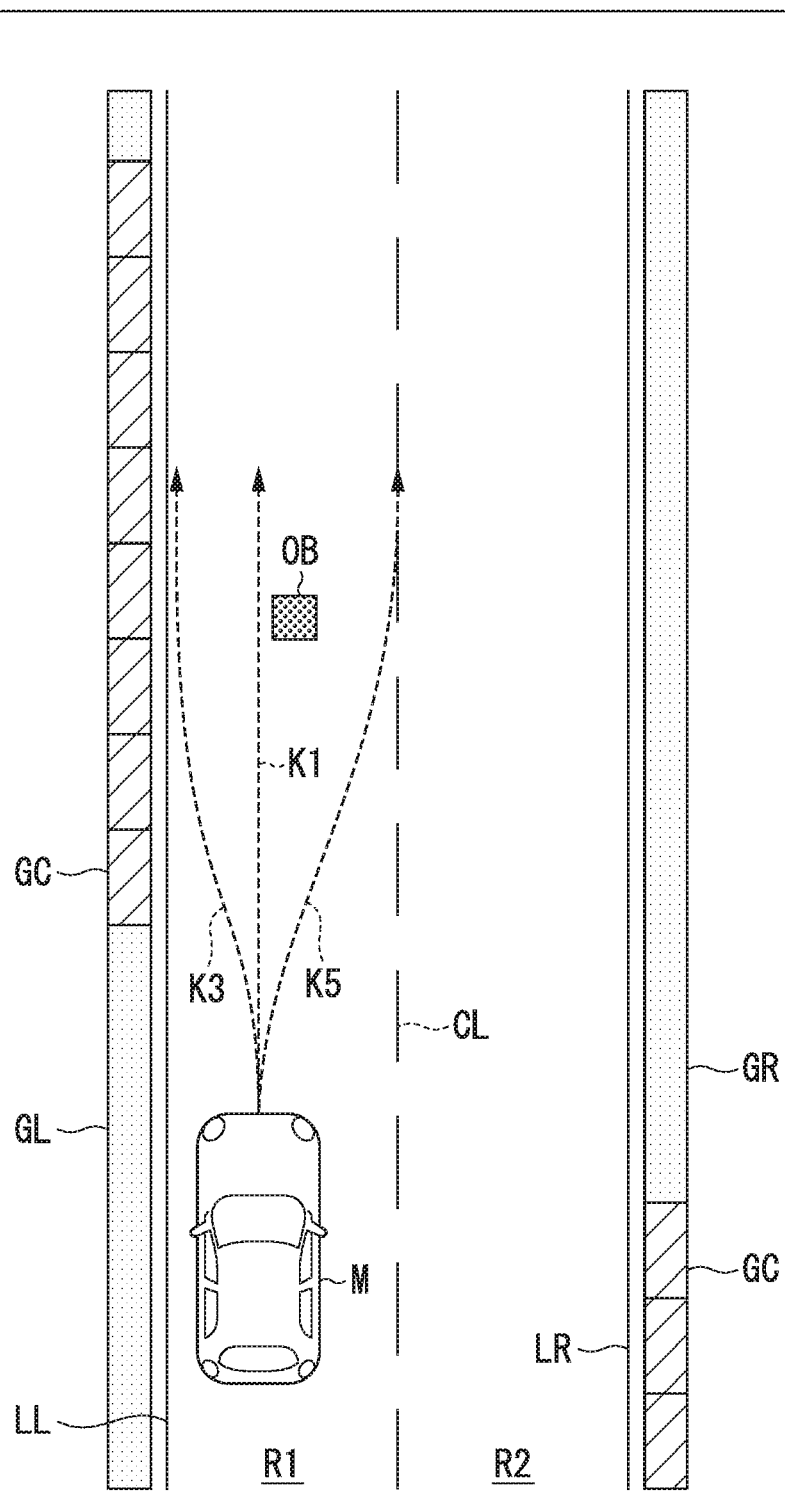
FIG. 9 is a view showing determination of the target trajectory on the basis of a priority.

In a case where the central line CL that partitions a travel lane and an opposite lane is recognized by the recognition unit 130, and in a case where the host vehicle M is caused to avoid an obstacle, the avoidance driving control unit 144 may determine a target trajectory of the host vehicle M by setting a priority of a trajectory candidate in which the wheel of the host vehicle M passes over the cover GC to be higher than a priority of a trajectory candidate in which the host vehicle M passes over the central line CL. FIG. 9 is a view showing determination of the target trajectory on the basis of the priority. In an example in FIG. 9, an example of a road R1 on which the host vehicle M travels, and a road R2 on which an oncoming vehicle travels are illustrated. In the example of FIG. 9, it is assumed that deviation of the host vehicle M from the road R1 includes a case where the wheel of the host vehicle M passes through the road R2 across the central line CL, and a case where the wheel passes over the cover GC. In the example of FIG. 9, it is assumed that an obstacle OB, over which the host vehicle M cannot pass between left and right wheels or over which the host vehicle M cannot pass, is recognized on a forward side of the road R1 on which the host vehicle M travels by the recognition unit 130. In the example of FIG. 9, it is assumed that the obstacle OB is an obstacle (for example, a falling object) other than a pedestrian. In this case, the avoidance driving control unit 144 generates a target trajectory K3 in which the wheel of the host vehicle M passes over the cover GC and passes the object OB, and a target trajectory K5 in which the wheel passes through the road R2 across the central line CL, and passes the obstacle OB as a trajectory candidate instead of a target trajectory K1 in which the obstacle OB does not fall. Here, the avoidance driving control unit 144 determines the target trajectory K3 as a target trajectory along which the host vehicle M is allowed to actually travel by setting a priority of the target trajectory K3 to be higher than that of the target trajectory K5. According to this, the host vehicle M can pass the object OB without travelling on the road R2. As a result, it is possible to realize smooth traffic by reducing an influence on other traffic participants (for example, an oncoming vehicle and a following vehicle of the host vehicle M).

Figure 10:
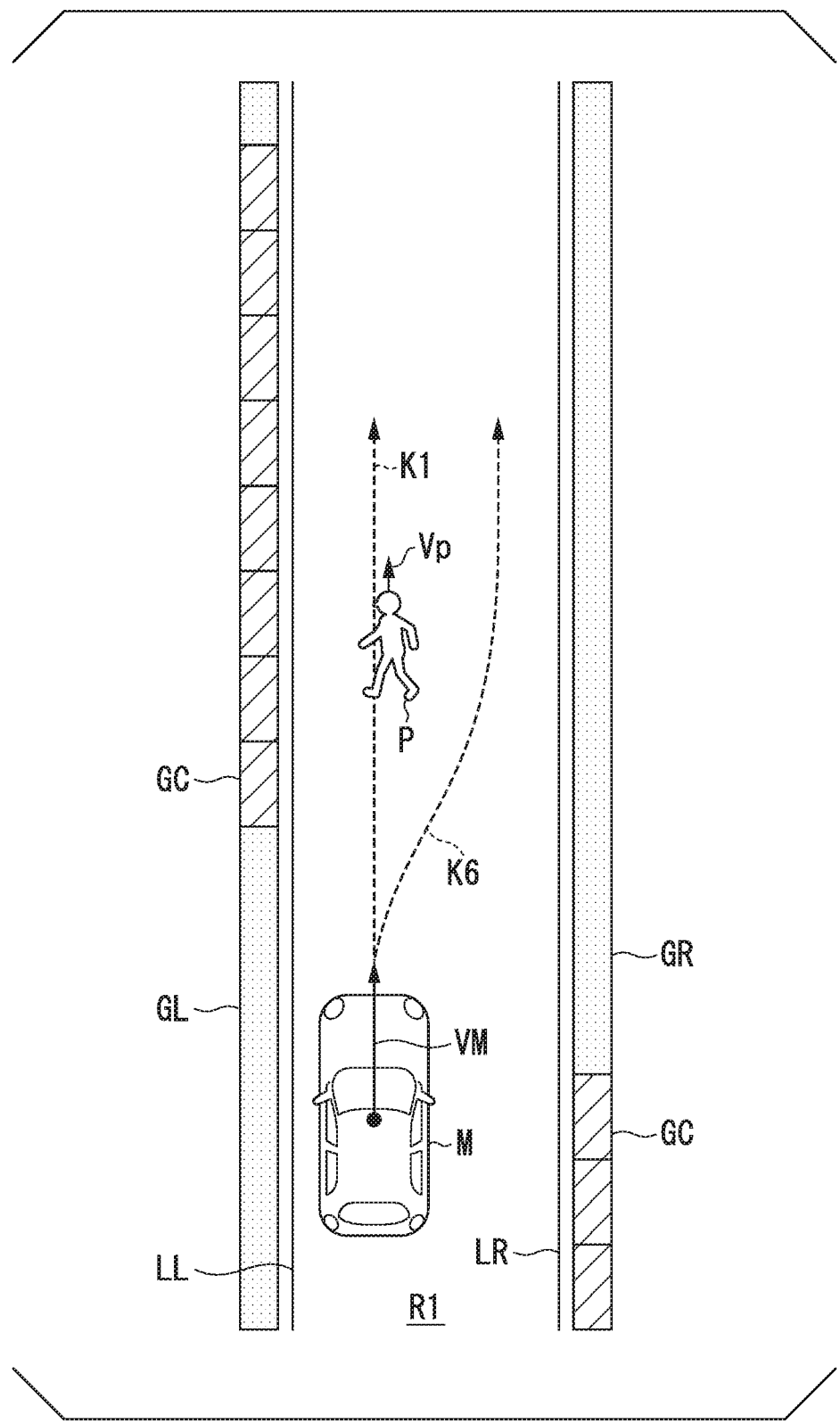
FIG. 10 is a view showing generation of the target trajectory in a case where a pedestrian exists in front of a host vehicle.

In a case where an obstacle that exists in front of the host vehicle M and is recognized by the recognition unit 130 is a pedestrian, the avoidance driving control unit 144 may generate a target trajectory of the host vehicle M in a state in which a trajectory along which the wheel of the host vehicle M passes over the cover GC is not included as a candidate. FIG. 10 is a view showing generation of a target trajectory in a case where a pedestrian P exists in front of the host vehicle M. In an example of FIG. 10, it is assumed that the pedestrian P on the road R1 is moving at a speed Vp [km/h] in approximately the same direction as an advancing direction of the host vehicle M. In this case, the passing determination unit 142 determines whether or not the host vehicle M can pass through a lateral side of the pedestrian P, and in a case where it is determined that the host vehicle M can pass through the lateral side of the pedestrian P, a trajectory candidate in which the wheel of the host vehicle M deviates from the road R1 and passes over the cover GC that is placed on the side groove GL is not generated, and a target trajectory K6 along which the wheel passes through a right side of the pedestrian P is generated as a trajectory candidate. In a case where the passing determination unit 142 determines that it is possible to pass through a lateral side of the pedestrian P by allowing the host vehicle M to travel along the target trajectory K6, the avoidance driving control unit 144 determines the target trajectory K6 as a target trajectory along which the host vehicle M actually travel.

In a case where it is determined that it is difficult to pass through a lateral side of the pedestrian P even when allowing the host vehicle M to travel along the target trajectory K6, the avoidance driving control unit 144 executes driving control of allowing the host vehicle M to follow the pedestrian P. Specifically, the avoidance driving control unit 144 controls a speed VM of the host vehicle M to a speed Vp of the pedestrian which is ±5 [km/h], and allows the host vehicle M to travel in a state in which a distance between the pedestrian P and the host vehicle M is maintained to a predetermined distance. In this case, the avoidance driving control unit 144 may set a target trajectory of the host vehicle M to follow a target route K1 that is generated by the action plan generation unit 140 in a case where the pedestrian P is not recognized, or to follow the other routes. In a case where it is determined that it is difficult to pass through a lateral side of the pedestrian P even when allowing the host vehicle M to travel along the target trajectory K6, the avoidance driving control unit 144 may execute driving control of stopping the host vehicle M. As described above, in a case where an obstacle is a pedestrian, a trajectory candidate in which the wheel of the host vehicle M passes over the cover GC is not generated, and thus it is possible to reduce frequency in which the wheel of the host vehicle M passes over the cover GC. It is possible to suppress a behavior of the host vehicle M such as a situation in which the host vehicle M passes through a lateral side of the pedestrian P from a side-groove side which is difficult to be predicted by the pedestrian P1, and thus the host vehicle M suddenly surprises the pedestrian P to fall or reel.

Processing Flow

Figure 11:
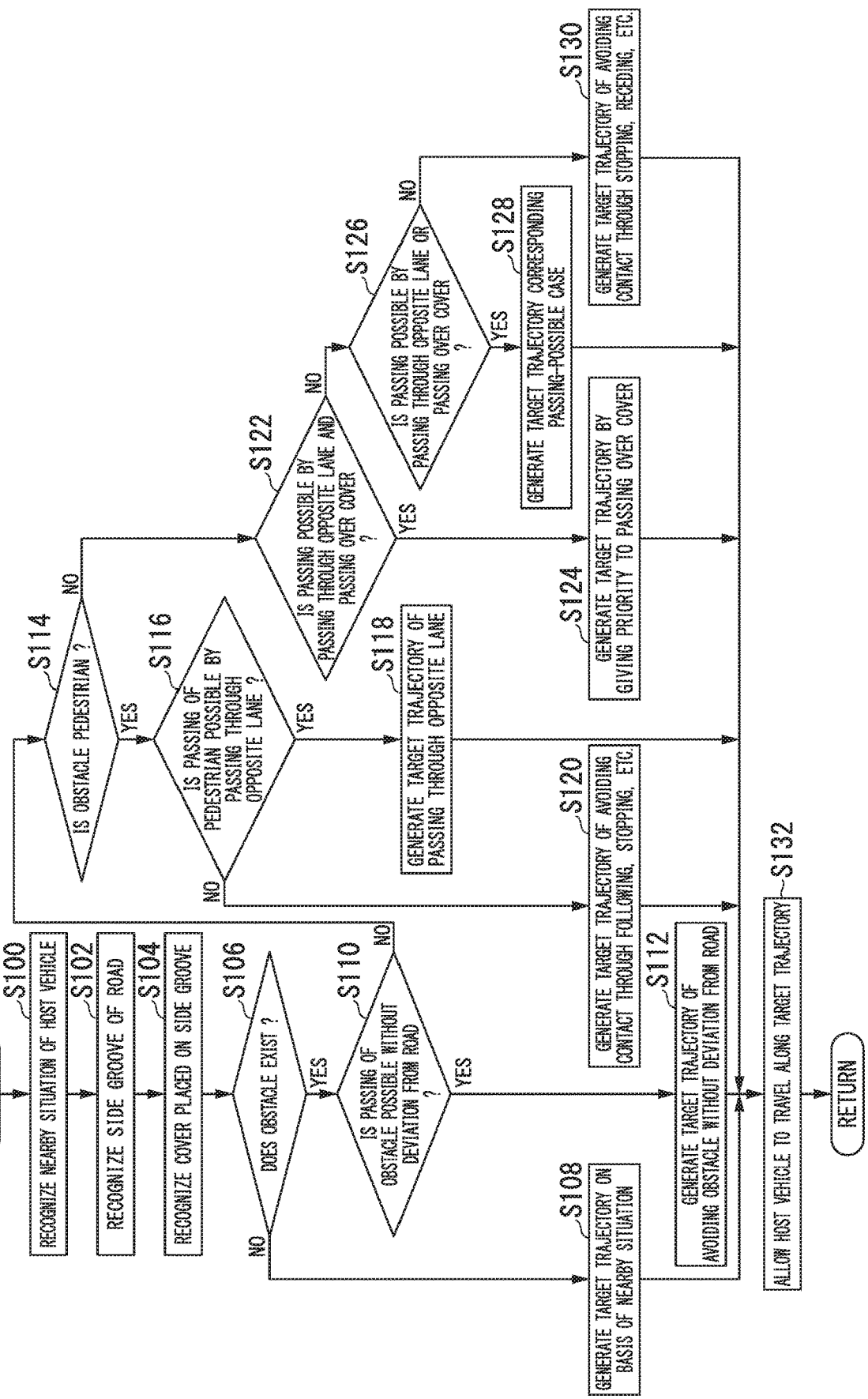
FIG. 11 is a flowchart showing a flow of processing that is executed by an automated driving control device of an embodiment.

FIG. 11 is a flowchart showing a flow of processing that is executed by the automated driving control device 100 according to the embodiment. For example, the processing of this flowchart may be repetitively executed at a predetermined cycle or at a predetermined timing. In the processing of this flowchart, it is assumed that automated driving of the host vehicle M is executed on the basis of a target trajectory that is generated by the action plan generation unit 140. It is assumed that the host vehicle M travels along the target trajectory that is generated by the action plan generation unit 140 during the automated driving. In the example of FIG. 11, it is assumed that the central line CL exists between the travel lane and the opposite lane on a road on which the host vehicle M travels as illustrated in FIG. 9, and deviation from the road includes a case where the wheel of the host vehicle M passes through the road R2 across the central line CL, and a case where the wheel passes over the cover GC.

In the example in FIG. 11, the recognition unit 130 recognizes a nearby situation of the host vehicle M (step S100). Next, the side groove recognition unit 132 recognizes a side groove of the road on which the host vehicle M travels (step S102). Next, in a case where the side groove is recognized by the side groove recognition unit 132, the cover recognition unit 134 recognizes a cover that is placed on the side groove (step S104).

Next, it is determined whether or not an obstacle exists on a forward side of the road on which the host vehicle M travel (step S106). In a case where it is determined that the obstacle does not exist, a target trajectory is generated on the basis of the nearby situation of the host vehicle M (step S108). In a case where it is determined that the obstacle exist, the passing determination unit 142 determines whether or not it is possible to pass the obstacle without deviation from the travel road (step S110). In a case where it is determined that it is possible to pass the obstacle without deviation from the travel road, the avoidance driving control unit 144 generates a target trajectory of avoiding the obstacle without deviation from the travel road (step S112). In the processing in step S112, for example, the avoidance driving control unit 144 generates a target trajectory of passing through a right side of a pedestrian (road center side) in a case where the obstacle is the pedestrian, and generates a target trajectory of passing the obstacle by passing through a left side or a right side of the obstacle in a case where the obstacle is an obstacle (for example, a falling object) other than the pedestrian. Specifically, for example, in a case where the obstacle is a falling object or the like, and an oncoming vehicle exists in an advancing direction of the host vehicle M, the avoidance driving control unit 144 generates a target trajectory of passing through a left side (road edge side) of the obstacle. In a case where the oncoming vehicle does not exist, the avoidance driving control unit 144 generates a target trajectory of passing through a right side (road center side) of the obstacle.

In the processing in step S110, in a case where it is determined that passing of the obstacle is difficult without deviation from the travel road, the avoidance driving control unit 144 determines whether or not the obstacle recognized by the recognition unit 130 is a pedestrian (step S114). In a case where the obstacle is determined as the pedestrian, the avoidance driving control unit 144 determines whether or not passing of the pedestrian is possible through an opposite lane (step S116). In a case where it is determined that passing of the pedestrian is possible through the opposite lane, the avoidance driving control unit 144 generates a target trajectory of passing through the opposite lane (step S118). In a case where it is determined that it is difficult to pass the pedestrian through the opposite lane, a target trajectory of avoiding contact by allowing the host vehicle M to follow the pedestrian or by stopping the host vehicle M is generated (step S120).

In the processing in step S114, in a case where it is determined that the obstacle is not the pedestrian, the avoidance driving control unit 144 determines whether or not passing is possible when the wheel of the host vehicle M passes through the opposite lane or passes over the cover (step S122). In a case where it is determined that passing is possible when the wheel passes through the opposite lane or passes over the cover, the avoidance driving control unit 144 generates a target trajectory by giving a priority to a case where the wheel passes over the cover (step S124). In a case where it is determined that passing is difficult when the wheel passes through the opposite lane or passes over the cover, the avoidance driving control unit 144 determines whether or not passing is possible when the wheel passes through the opposite lane or passes over the cover (step S126). In a case where it is determined that passing is possible when the wheel passes through the opposite lane or passes over the cover, the avoidance driving control unit 144 generates a target trajectory in response to a passing-possible case (step S128). In a case where it is determined that passing is difficult even in both of the case where the wheel passes through the opposite lane and the case where the wheel passes over the cover, the avoidance driving control unit 144 generates a target trajectory of avoiding contact by stopping or receding the host vehicle M, and the like (step S130).

Next, the second control unit 160 allows the host vehicle M to travel along the target trajectory that is determined in the processing in step S108, S118, S120, S124, S128, or S130 (step S132). According to this, the processing in this flowchart is terminated.

According to the above-described embodiment, the vehicle control device includes the recognition unit 130 that recognizes a nearby situation of the host vehicle M, and the driving control unit (the action plan generation unit 140, the second control unit 160) that automatically controls at least steering of the host vehicle M on the basis of the nearby situation that is recognized by the recognition unit 130. In a case of allowing the host vehicle to avoid an obstacle that exists in an advancing direction of the host vehicle M and is recognized by the recognition unit 130, the driving control unit generates a target trajectory of the vehicle in a state in which a trajectory, along which the wheel of the host vehicle passes over a cover that is placed on a groove provided in a road edge and is recognized by the recognition unit 130, is included as a candidate. Accordingly, it is possible to realize smoother passing driving. According to this embodiment, in a case where the side groove exists in the road, and the cover is placed on the side groove, the wheel does not approach the side groove in typical travelling, but the wheel is permitted to pass over the cover of the side groove only in a case of passing an oncoming vehicle and the like on a narrow road. Accordingly, it is possible to increase a trajectory candidate for avoiding contact with an obstacle. As a result, it is possible to execute appropriate avoidance driving control on the basis of a road situation.

Hardware Configuration

Figure 12:
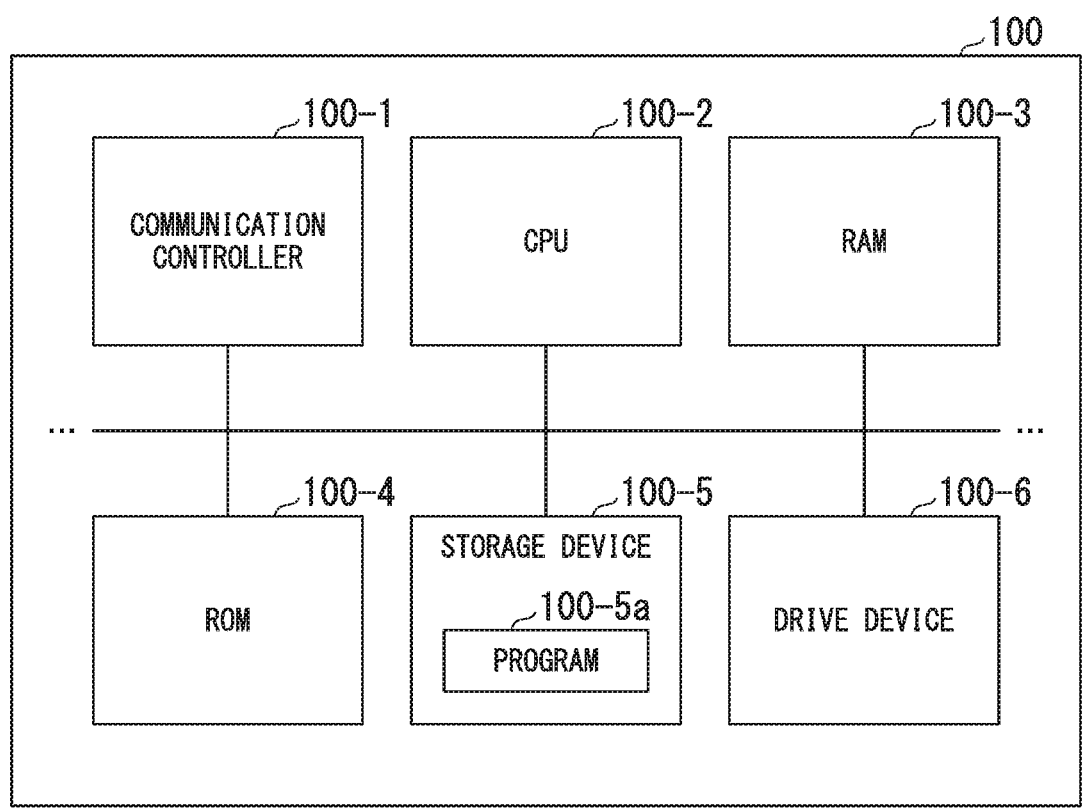
FIG. 12 is a view showing an example of a hardware configuration of the automated driving control device of the embodiment.

FIG. 12 is a view showing an example of a hardware configuration of the automated driving control device 100 according to this embodiment. As illustrated in the drawing, the automated driving control device 100 has a configuration in which a communication controller 100-1, a CPU 100-2, a random access memory (RAM) 100-3 that is used as a working memory, a read only memory (ROM) 100-4 that stores a booting program, and the like, a storage device 100-5 such as a flash memory and a hard disk drive (HDD), a drive device 100-6, and the like are connected through an internal bus or a dedicated communication line. The communication controller 100-1 performs communication with a constituent element other than the automated driving control device 100. A portable storage medium such as an optical disc (for example, a non-transitory computer-readable storage medium) is mounted in the drive device 100-6. A program 100-5a that is executed by the CPU 100-2 is stored in the storage device 100-5. The program is developed in the RAM 100-3 by a direct memory access (DMA) controller (not illustrated), and is executed by the CPU 100-2. The program 100-5a that is referenced by the CPU 100-2 may be stored in the portable storage medium that is mounted in the drive device 100-6, or may be downloaded from other devices through a network. According to this, parts or the entirety of the first control unit 120 and the second control unit 160 of the automated driving control device 100 are realized.

The above-described embodiment can be expressed as follows.

A vehicle control device including:
a storage device that stores a program; and
a hardware processor,
wherein the hardware processor executes the program stored in the storage device to recognizes a nearby situation of a vehicle, and to automatically control at least steering of the vehicle on the basis of the nearby situation that is recognized, and in a case where an obstacle that exists in an advancing direction of the vehicle and a road-side structure that is provided in a road edge are recognized, the hardware processor generates a target trajectory of the vehicle in a state in which a trajectory along which a wheel of the vehicle passes over the road-side structure is included as a candidate.

While preferred embodiments of the invention have been described and illustrated above, it should be understood that these are exemplary of the invention and are not to be considered as limiting. Additions, omissions, substitutions, and other modifications can be made without departing from the spirit or scope of the present invention. Accordingly, the invention is not to be considered as being limited by the foregoing description, and is only limited by the scope of the appended claims.

What is claimed is:

1. A vehicle control device comprising:
   a recognition unit that recognizes a surrounding situation of a vehicle; and
   a driving control unit that automatically controls at least steering of the vehicle on the basis of the surrounding situation that is recognized by the recognition unit,
   wherein the recognition unit recognizes an obstacle that exists in an advancing direction of the vehicle and a road-side structure that is provided outside of a road edge of a road that is partitioned by a road partition line, and
   wherein the driving control unit determines that the vehicle cannot pass the obstacle in a state in which the vehicle is traveling on the road edge on the basis of a recognition result of the recognition unit, and in a case that a total value of the vehicle width of the vehicle and a protruding distance of the obstacle from the road edge toward the road center side is less than a total value of a road width and width of the road-side structure, determines that the vehicle can pass over the road-side structure.

2. The vehicle control device according to claim 1,
wherein the driving control unit generates a target trajectory along which the vehicle travels in the future on the basis of a candidate, the candidate including a trajectory along which the vehicle passes over the road-side structure, and
wherein in a case where the obstacle is not recognized in the advancing direction of the vehicle by the recognition unit, the driving control unit generates the target trajectory of the vehicle in a state in which the trajectory that passes over the road-side structure is not included in the candidate.

3. The vehicle control device according to claim 1,
wherein the driving control unit generates a target trajectory along which the vehicle travels in the future on the basis of a candidate, the candidate including a trajectory along which the vehicle passes over the road-side structure, and
wherein in a case where the vehicle avoids the obstacle, the driving control unit determines whether or not to generate the target trajectory along which a wheel of the vehicle passes over the road-side structure on the basis of a material of the road-side structure which is recognized by the recognition unit.

4. The vehicle control device according to claim 1,
wherein the driving control unit sets a speed of the vehicle in a case where the wheel of the vehicle passes over the road-side structure to be slower than a speed in a case where the vehicle travels on the road.

5. The vehicle control device according to claim 1,
wherein in a case where the wheel of the vehicle rides on the road-side structure, the driving control unit controls steering of the vehicle so that an angle of the wheel with respect to an extension direction of a side edge portion of the road-side structure becomes a predetermined angle or greater.

6. The vehicle control device according to claim 1,
wherein the driving control unit generates a target trajectory along which the vehicle travels in the future on the basis of a candidate, the candidate including a trajectory along which the vehicle passes over the road-side structure, and
wherein in a case where the obstacle is a pedestrian, the driving control unit generates the target trajectory of the vehicle in a state in which the trajectory along which the wheel passes over the road-side structure is not included in the candidate.

7. A vehicle control method comprising:
recognizing a surrounding situation of a vehicle by a vehicle control device;
automatically controlling at least steering of the vehicle by the vehicle control device on the basis of the surrounding situation that is recognized;
recognizing an obstacle that exists in an advancing direction of the vehicle and a road-side structure that is provided outside of a road edge of a road that is partitioned by a road partition line; and
determining that the vehicle cannot pass the obstacle in a state in which the vehicle is traveling on the road edge on the basis of a recognition result, and in a case that a total value of the vehicle width of the vehicle and a protruding distance of the obstacle from the road edge toward the road center side is less than a total value of a road width and width of the road-side structure, determining that the vehicle can pass over the road-side structure.

8. A non-transitory computer-readable storage medium storing a program for causing a vehicle control device to:
recognize a surrounding situation of a vehicle;
automatically control at least steering of the vehicle on the basis of the surrounding situation that is recognized;
recognize an obstacle that exists in an advancing direction of the vehicle and a road-side structure that is provided outside of a road edge of a road that is partitioned by a road partition line; and
determine that the vehicle cannot to pass the obstacle in a state in which the vehicle is traveling on the road edge on the basis of a recognition result, and in a case that a total value of the vehicle width of the vehicle and a protruding distance of the obstacle from the road edge toward the road center side is less than a total value of a road width and width of the road-side structure, determine that the vehicle can pass over the road-side structure.

* * * * *